Nov. 11, 1947.                R. HAYWARD                2,430,637
               MEANS AND A METHOD FOR TESTING OPTICAL SURFACES
                    Filed Dec. 8, 1944           3 Sheets-Sheet 1

INVENTOR.
ROGER HAYWARD
BY
ATTORNEYS

Nov. 11, 1947.  R. HAYWARD  2,430,637
MEANS AND A METHOD FOR TESTING OPTICAL SURFACES
Filed Dec. 8, 1944  3 Sheets-Sheet 2

INVENTOR.
ROGER HAYWARD
BY
ATTORNEYS

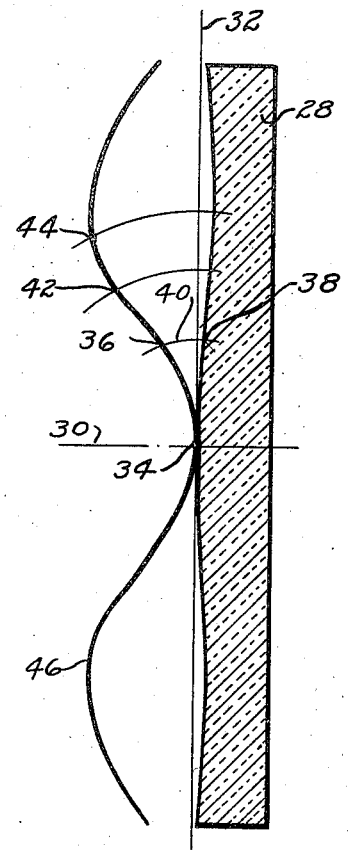

Patented Nov. 11, 1947

2,430,637

UNITED STATES PATENT OFFICE 2,430,637

MEANS AND A METHOD FOR TESTING OPTICAL SURFACES

Roger Hayward, Pasadena, Calif.

Application December 8, 1944, Serial No. 567,233

18 Claims. (Cl. 33—175)

The invention described herein may be manufactured and used by or for the Government for governmental purposes, without the payment to me of any royalty thereon.

This invention relates to means and a method for testing optical surfaces. It is particularly useful in testing nonspherical surfaces of revolution such, for instance, as the surfaces of correcting lens for Schmidt cameras.

In the process of providing Schmidt correcting lens, there is a very essential need for a means and method whereby the lens surface may be examined in minimum time, particularly in the early stages of figuring.

It is therefore an object of the invention to provide a method and a means for testing surfaces of this kind which is relatively simple in construction and operation, economical to put into effect and rapid in its application.

Other objects, advantages, and applications of the invention will become apparent to one skilled in the art as the invention is more specifically described and reference is had to the drawing, wherein:

Fig. 5 is a section through the lens taken at 5—5 of Fig. 1 and shows also the method employed for developing the curves seen on the chart 14.

Figure 1:
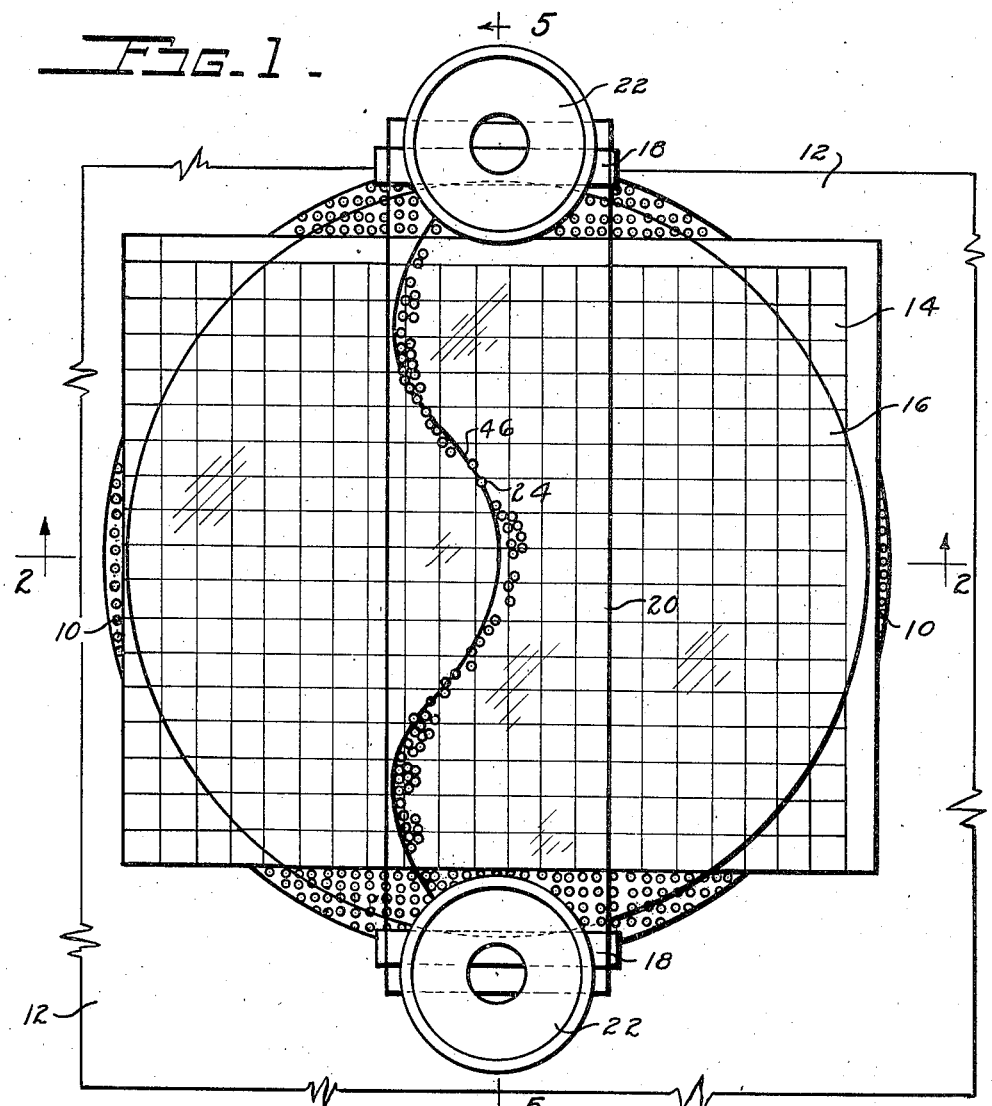
Fig. 1 is a plan view of a simple form of the invention, showing a surface in the process of being tested.
Figure 2:
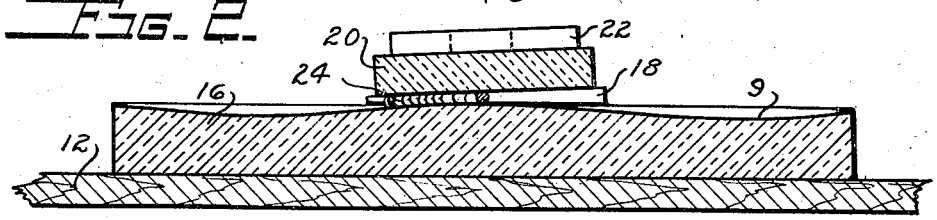
Fig. 2 is a central sectional view through the device taken on the line 2—2 of Fig. 1.

Referring particularly to Figs. 1 and 2, which show the correction lens of a Schmidt camera in the process of having its surface 9 tested, a nodular rubber mat 10 is placed on a table 12 with the nodulus side of the mat upward to level out any slight inaccuracies in the surfaces which it separates and to prevent shift between the several parts. A chart 14 is laid face up on the mat and the correction lens 16 is laid flat side down on the chart and curved surface upward. Wedges 18 are laid one opposite the other on the outer edge of the correction lens with the thinner end of the wedge pointing left. A glass plate 20, having at least one plane surface, is laid with its plain surface downward, the ends of the plate resting on the wedges. Weights 22 are laid on the outer ends of the plate 20 to hold it firmly against the wedges. Some suitable cementitious material may be used to fasten the weights 22 to the plate 20 and the plate 20 to the wedges 18, whereby the assembly 18—20—22 may be removed and reapplied as a unit. Ground steel balls 24, all exactly the same size, are now inserted between the plate 20 and the lens 16 at the right side of the plate and allowed to roll toward the left. The right side of the table 12 may be raised slightly to facilitate rolling of the balls. A three degree slope of the table top should be sufficient. The balls roll on the curved surface of the lens and finally wedge between the lens and the flat plate at points where the distance between the lens and plate is equal to the diameter of the balls. It is noted that the slope of the wedges should exceed the maximum slope of the lens with respect to a plane normal to the optical axis. The curve defined by the row of balls is an exaggeration of the curve defined by an axial section through the lens under examination and may be compared with a curve 46 on the chart which is an exaggeration of the curve of the lens in its final form.

If qualitative analysis only is desired, the wedges and the chart need not be in very close correspondence, but if quantitative analysis is desired, the wedges and the chart must be closely coordinated. The procedure in laying out a chart 14 for quantitative analysis of the lens is described with reference to Fig. 5. Fig. 5 shows a cross section 28 assumed to be taken through a perfect lens preferably at or near its axis 30. A line 32 is drawn normal to the axis and tangent to the lens surface at 34. Assuming that the wedges 18 are made with a slope of 1 to 100, a given point for the chart, as for instance point 36, will be located at 100 times the distance from the line 32 as the point 38 on the theoretically perfect lens, measured normally to 32. Other points 42—44 for the chart are found in like manner until the outline 46 is established. If a proper proportion is maintained between the thickness of the wedges 18 and the diameter of the balls 24, a ball will stop centered on the point 34 of the chart. If the lens being tested has reached perfection, a row of the balls will center on the line 46. The measured distance which any ball is off the line 46 is a function of the imperfection of the lens at the corresponding point, the imperfection being $1/100$ of the measured distance. Thus if the center of a ball measures .01 off the line 46, it indicates that the corresponding point on the lens is off the true surface by .0001 inch.

It is noted that while the line 46 is shown as being placed on a sheet of paper which is under the lens being tested, where the device is to be used on one size and configuration of lens only, the outline 46 may be permanently scribed on the plate 20.

In the exemplification of the invention hereinbefore described with reference to Figs. 1 and 2, the wedges 18 were positioned with respect to the lens by contact of one of the flat sides of the wedges with the surface of the lens at its outer edge, which requires that the lens has an edge zone which will provide a suitable support which is, with sufficient accuracy, normal to the optical axis of the lens, or which has some known relation to the surface of the lens or its axis. Usually a Schmidt lens has an edge zone suitable for the above purpose, but not always, and many other optical surfaces to which the test may be usefully applicable have no such edge zone. The means and method next described with reference to Figs. 3 and 4 makes provision for testing any surface of revolution (including flats), and does not require any particular form of edge zone.

Figure 3:
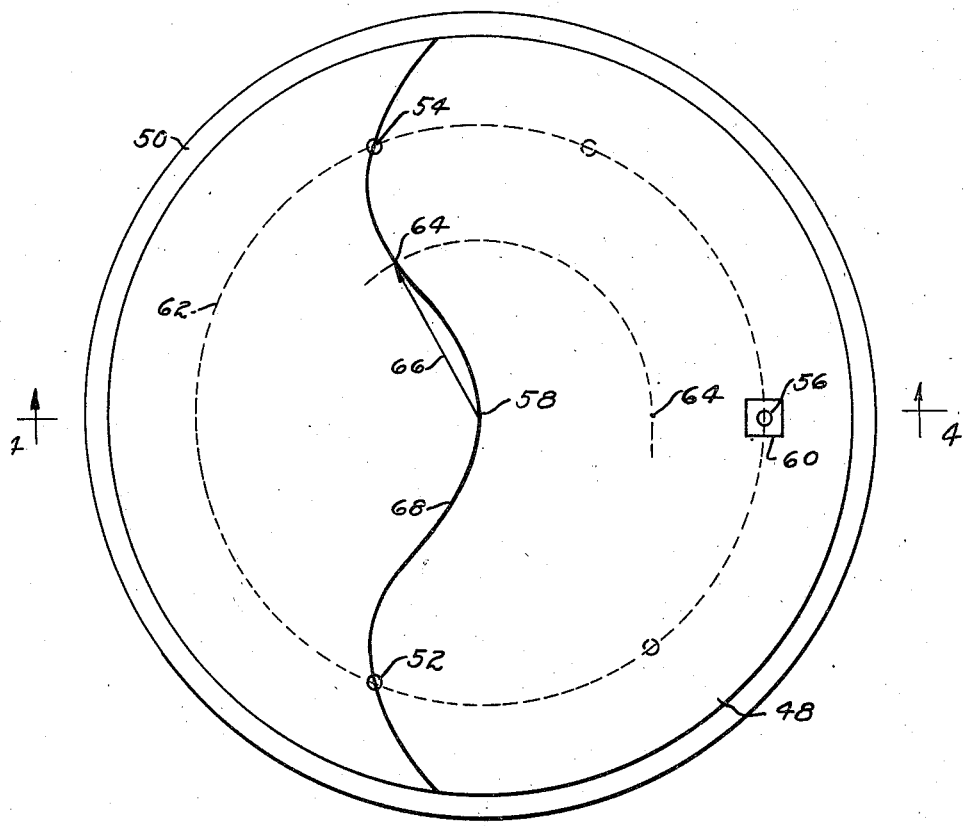
Fig. 3 is a plan view of another form of the invention which has certain advantages in some applications over the embodiment shown in Figs. 1 and 2.
Figure 4:
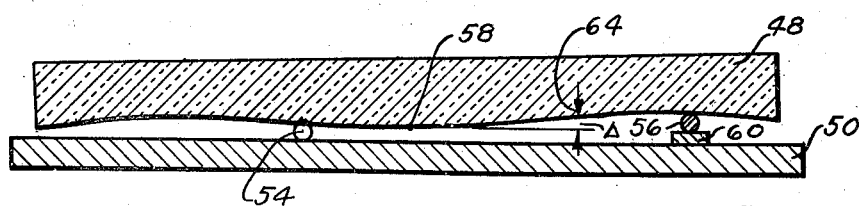
Fig. 4 is a central sectional view taken through the device on the line 4—4 of Fig. 3.

In the embodiment shown in Figs. 3 and 4, the lens 48 or other work surface under test is supported in spaced relation to a test plate 50 of known surface contour, in this case a flat, by spacers in the form of three balls 52, 54, and 56, which are preferably centered on a common radius from the axis 58 of the work surface. The spacers are shown in isosceles arrangement, with the two balls 52 and 54 centered at the extremities of the base and the ball 56 centered at the apex. Now by making the apex spacer 56 larger or smaller than the base spacers 52—54, the space between the lens and the plate will respectively diverge or converge from the base to the apex. Where the spacers are so arranged, the desired slope between the lens and the plate being known, a simple mathematical calculation will determine the required difference in size between the base spacers 52—54 and the apex spacer 56. This difference may be made up by using balls 52—54 of larger or smaller diameter than ball 56 or by providing three balls of equal diameter and blocking up either or both balls 52—54 or the single ball 56 as may be required.

In the embodiment shown, Figs. 3 and 4, the three balls 52, 54, and 56 are of equal diameter, and, since it is desired that the interfacing surfaces of the plate and lens be generally divergent from left to right, i. e., from base to apex of the isosceles triangle shown, a chair 60 of precalculated thickness is placed on the plate 50 under the ball 56 to provide the desired slope. Here, as in Figs. 1 and 2, the slope between the plate 50 and a plane normal to the lens axis should exceed the maximum slope between the same plane and the working surface of the lens. The slope can be reversed by removing the chair 60 from under the ball 56 and placing a chair 60 under each of the balls 52 and 54.

When the three balls 52, 54, and 56 are positioned as shown, with a chair 60 under the ball 56, they may be fixed in position by some suitable adhesive before the lens is laid in place. The lens is then laid on the spacers with the working surface downward and its axis coincident with the center 58 of the circle 62 which passes through the balls 52, 54, and 56. This centering of the lens may be done by eye with sufficient accuracy for all ordinary purposes by coordinating delineated points of reference on the plate and lens respectively, or, for extreme accuracy, some mechanical locating device may be provided.

The above described arrangement is advantageously followed when the test plate is a flat. If the test surface is other than a flat, a larger ball is used instead of the chair-and-ball 60—56, the larger ball being of such size as will have the same spacing as the chair and ball taken together. The larger ball provides a point contact for engagement with both plate and lens, a requisite when the surfaces of both are curved. Such other arrangements of the spacers 52, 54, 56—60, or similar spacers, as will provide a conveniently determinable slope may be employed.

With a plate and lens spaced apart by spacing balls arranged as shown in Fig. 4, the test balls may be applied. If the test balls are of the same size as balls 52—54—56, then the row of test balls will always establish a curve which passes through the fixed ball or balls which have no chair. In the illustration Fig. 3, balls 52, 54 have no chair, so the test balls of the same size establish a curve which passes through the two fixed spacer balls 52—54. The two balls 52—54 have been located on the circle 62 in such positions that, with the chosen slope established by the chair under ball 56, the row of test balls will pass through the center 58. If, on the other hand, it is the ball 56 which has no chair then the row of test balls will not pass through the center of a work surface such as an ordinary Schmidt correcting lens. However in certain other kinds of work the single unchaired ball or smaller spacer may be used to advantage.

Where the test plate 50 is a flat as shown in Fig. 4, then the curve 68 of the row of test balls simply represents, in exaggeration, the contour of the working surface of the lens 48. Letting $\Delta$ equal the dimension from a plane, normal to the lens axis and tangent to its working surface at 58, to a point 64 on the curved surface of the lens, the dimension $$\frac{\Delta}{\text{slope}}$$

represents, in exaggeration, the depth of any point 64 at the radius 66, the radius 66 appearing in the diagram of the curve as a circular coordinate.

If the surface of the test plate is other than a flat, the curve of the row of balls represents in exaggeration the comparison between the curves of the two surfaces. Such an arrangement may conveniently be used to test two matching surfaces, since, when the surfaces match, the row of test balls will lie in a straight line passing through the two balls 52—54, or, where the balls 52—54 each has a chair and ball 56 has none the test balls will be in a line passing through the ball 56. Where the central portion of matching surfaces are important the smaller spacer or spacers should be fixed on a diameter, whereby the test line will pass through the center.

In testing an obverse, i. e., a reflecting Schmidt correcting plate, or any surface which is generally concave inside the circle on which the spacers are arranged, if the spacers are arranged as in Fig. 3, the curve of the row of test balls will be reversed from the shape shown and will not pass through the central parts of the work surface. Where the central part is not important, that arrangement may suffice, but where the central part is important, an exaggerated reverse curve may be made to pass through the center by reversing the slope of the work surface, i. e., by using a ball 56 which is smaller than the balls 52—54 or by blocking up or enlarging the two balls 52—54, then using test balls of a size equal to the larger spacing. The exaggerated curve 68 will then follow the contour shown in Fig. 3.

In any case where two larger and one smaller spacers are used, the smaller spacer may in some cases be eliminated by resting one surface on the other at that third point of support.

It is noted that the test balls need not in any of the instances referred to be of the same size as one or the other of the spacers. It is, however, most convenient to have the spacing balls of such a size since the placement of the spacers then locates the test row with relation to the work surface, and the curve established by the test row then gives the information directly in relation to a point or points, i. e., the spacer points, whose location is precisely known.

Throughout the foregoing description it has been essentially assumed that the three spacers 52, 54, and 56 are placed at equal radii about the center of the surface of revolution being tested, and such a placement does have great practical advantage because the relative slope of the work surface with respect to the test plate is then known, and the curve established by the row of test balls can then be readily translated into quantitative knowledge. Qualitative information about the work surface may, however, be obtained no matter where the spacing balls are placed as, for instance, if the spacer 60—56 is placed off the circle whose center is 58. That qualitative information may be ample in some cases, or in all cases while rough shaping is being effected.

The test balls which are introduced between the work and test surfaces may be considered as representing, and as being a convenient form of any gauging material which is made up of elements that are physically mobile and are all of the same size. Ground steel balls have an advantage in that they may be obtained from stock, but a considerable advantage is had in the use of small cylinders, preferably of the same length as the balls in a given case, the cylinders being placed on end on the test plate and slid into place. Since the forward edges of the cylinders give the same point contact measurement as the balls, the cylinders will come to rest on a finished work surface with their forward edges on the test line. It is obviously a simpler matter to measure the distance which the forward end of a cylinder is short of the gauge line than it is to measure the distance which the center of a ball is short of the gauge line, because of the fact that the forward portion of the ball may obstruct the view of the gauge line before its center aligns itself therewith.

Having described several embodiments of my invention and outlined several methods of procedure employed in carrying the invention into effect, I claim:

1. A device for testing an unknown surface against a known test surface which consists of means for supporting the two surfaces in interfacing relation with a predetermined relative slope between the mean planes of the two surfaces, said slope being greater than the algebraic sum of the slopes of the two surfaces at any point with respect to their mean planes, and a plurality of mobile spacing units of uniform size and shape adapted to wedge in the sloping space between the surfaces, thereby establishing a curve which is a function of the relative figures of the two surfaces.

2. Means for testing an irregular surface which consists of a test plate having one flat side positioned adjacent said irregular surface with its flat side next to said irregular surface, means for maintaining a predetermined slope between the flat side of the test plate and the mean plane of the irregular surface, said slope being greater than the maximum slope between the irregular surface and said plane, gauging means for insertion between the test plate and the irregular surface which consists of mobile units of uniform spacing capacity adapted to wedge between said plate and said irregular surface in a curved line representing the contour of the irregular surface but exaggerated in the same ratio as the slope, and a curved reference means of the contour of the desired completed surface but exaggerated in the same ratio as the slope.

3. A device for testing a surface of revolution, which consists of a test plate having one flat side arranged face to face with said surface of revolution, means for maintaining a predetermined slope between the flat side of the test plate and a plane normal to the axis of said surface of revolution, said slope being greater than the maximum slope between the said surface of revolution and said plane, gauging means, for insertion between the test plate and the said surface of revolution, which consists of mobile units of uniform size adapted to wedge between said plate and said surface of revolution in a curved line which represents the contour of the surface of revolution being tested exaggerated in the same ratio as the ratio of said slope, said test plate carrying an immobile chart line which represents the contour to which the first said contour must correspond when the surface of revolution is completed.

4. A device for testing a surface of revolution which consists of a test plate having one flat side placed face-to-face with said surface of revolution, three point spacers located in isosceles arrangement on a common circle on said flat side, one of said spacers differing in spacing capacity from the other two, thereby establishing a slope of predetermined ratio between the flat sides of the test plate and a plane tangent to, and normal to the axis of said surface of revolution, said slope being greater than the maximum slope between the said surface of revolution and said plane, gauging means insertable between the test plate and the said surface of revolution, which consists of mobile units of uniform size adapted to wedge between said plate and said surface of revolution in a curved line which represents the contour of the surface of revolution being tested exaggerated in the same ratio as the ratio of the slope, and means carrying an immobile curved line with which the first curved line is compared.

5. The device of claim 4 in which two of the point spacers are of smaller spacing capacity than the third.

6. The device of claim 4 in which two of the point spacers are of smaller spacing capacity than the third and the mobile units are of the same spacing as the two smaller point spacers.

7. A device for testing the surface of a lens which consists of a tilted table top, a chart placed on said top, said chart having drawn thereon an exaggeration of the curve taken along a cross section of the work surface of the finished lens, a transparent test plate having one flat side, positioned above said lens with its flat side downward, wedges placed between said test plate and said lens tapered to maintain a predetermined slope between the underside of the test plate and a plane normal to the lens axis, the amount of said slope being a function of the extent of said exaggeration, said slope being greater than the maximum slope between the lens and said plane, and a gauging means, adapted to be injected between the test plate and the lens, which consists of balls of uniform size adapted because of the slope of said table to roll and wedge between said plate and said lens in a curved row, each ball being thereby centered over the curve on said chart when the working surface of the lens reaches its desired finished contour.

8. A device for testing the surface of a correction lens for a Schmidt camera, which consists of a tilted table top, a nodular rubber mat having one nodulus side, placed on said table top with the nodulus side upward, a chart placed on said mat, said chart having drawn thereon an exaggeration of the curve of the work surface of the finished lens taken in cross section, a transparent test plate having at least one flat side positioned above said lens with its flat side downward, wedges placed between said test plate and the outer edge of said lens, tapered to maintain a predetermined slope between the underside of the test plate and a plane normal to the lens axis, the ratio of said slope and said exaggeration being equal, said slope being greater than the maximum slope between the lens and said plane, and a gauging material, adapted for insertion between the test plate and the lens, said material consisting of balls of uniform size adapted because of the slope of said table to roll and wedge between said plate and said lens in a curved row, each ball being thereby centered over the curve on said chart when the working surface of the lens at said cross section reaches its desired finished contour.

9. Steps in the method of testing an unknown surface against a known test surface, which include placing the two surfaces in spaced face-to-face relation and with the two surfaces at an established relative slope, and introducing between the two surfaces a gauging material which consists of mobile elements of uniform size to establish a row of the elements in contact with both surfaces, the element row establishing a curve which is descriptive of the relative figures of the two surfaces.

10. Steps in the method of testing an unknown surface against a known test surface, which include placing the surfaces in spaced face-to-face relation and with the two surfaces having a quantitively known spacing and slope ratio, and introducing between the two surfaces a gauging means consisting of a plurality of mobile elements of uniform size and known dimensions, thereby to establish a row of elements in contact with both surfaces, whereby the element row establishes a curve which is quantitively descriptive of the relative figures of the two surfaces.

11. Steps in the method of testing an unknown surface against a known test surface, which include placing the two surfaces in spaced face-to-face relation and with the two surfaces at an established relative slope, and locating a series of points at which the spacing between the two surfaces is equal, whereby said series of points delineate a curve which is descriptive of the relative figures of the two surfaces.

12. Steps in the method of testing an unknown surface against a known test surface, which includes placing said surfaces in spaced face-to-face relation and with the mean planes of the two surfaces having a quantitively known spacing and slope ratio, and establishing a series of points at which the spacings between the two surfaces are equal, thereby establishing a row of points which is quantitively descriptive of the relative figures of the two surfaces.

13. Steps in the method of testing a surface of revolution against a flat test surface, which include supporting the two surfaces in face-to-face relation with the plane of the test surface at a fixed slope with respect to a plane normal to the axis of revolution, then locating a row of points having the same spacing as the spacing between the surfaces along the axis of revolution, whereby a curve is formed by said points delineating the curve of the surface of revolution in exaggeration.

14. Steps in the method of testing a surface of revolution against a flat test surface, which include placing the two surfaces in face-to-face relation, spacing them apart at three points equidistant from the axis of revolution, the spacing at one of said points differing from the spacing at the other two, whereby the test surface is positioned at a fixed slope relative a plane normal to the axis of revolution, and locating a series of points at which said surfaces are of equal spacing, whereby a curve is formed by said points which represent the curve of the surface of revolution in exaggeration.

15. Steps in the method of testing an unknown surface of revolution against a known surface of revolution, which include placing the two planes which are respectively tangent to the two surfaces at their axes, and respectively normal to the axes of said surfaces, at a quantitively known spacing and slope ratio, then locating a series of points at which the spacings between the two surfaces are equal to the quantitively known spacing, thereby establishing, by said points, a curve which is quantitively descriptive of the relative figures of the two surfaces.

16. Steps in the method of testing an unknown surface of revolution against a known test surface, which includes placing the two surfaces in face-to-face relation, spacing them apart at three points equidistant from the axes of revolution, the spacing at one of said points differing from the spacing of the other two, whereby the test surface is positioned at a fixed slope relative to a plane normal to the axis of revolution, and locating a series of points at which the surfaces are at equal spacing, thereby to form a curve descriptive of the relation between the two surfaces.

17. Steps in the method of testing a surface of revolution against a test plate of known surface, which includes placing the two surfaces in face-to-face relation, spacing them apart at three points equidistant from the axes of revolution, the spacing of two of said points differing from that of the third, whereby the test surface is positioned at a fixed slope relative to a plane normal to the axis of revolution, and locating a series of points at which the surfaces are at equal spacing and of a spacing equal to one of the three said points, whereby a curve is formed which is descriptive of the relation between the two surfaces.

18. Steps in the method of testing a surface of revolution against a test plate of known surface, which includes placing the two surfaces in face-to-face relation, spacing them apart at three points equidistant from the axis of revolution, the spacing of the first and second points being alike and that of the third point being different from the first and second, whereby the test surface is positioned at a fixed slope with respect to a plane normal to the axis of revolution, and locating a series of points at which the spacings are equal to each other and equal to the spacing of the said first and second points, thereby to form a curve which passes through the said first and second points and is descriptive of the relation between the two surfaces.

ROGER HAYWARD.

REFERENCES CITED

The following references are of record in the file of this patent:

UNITED STATES PATENTS

| Number | Name | Date |
|---|---|---|
| 2,052,153 | Willis | Aug. 25, 1936 |